(12) United States Patent
Ogata

(10) Patent No.: US 6,172,949 B1
(45) Date of Patent: Jan. 9, 2001

(54) DISK RECORDING OR PLAYBACK DEVICE AND METHOD OF ADJUSTING INITIAL POSITION OF PICKUP THEREOF

(75) Inventor: Hitoshi Ogata, Sakai (JP)

(73) Assignee: Sanyo Electric Co., Ltd., Moriguchi (JP)

(*) Notice: Under 35 U.S.C. 154(b), the term of this patent shall be extended for 0 days.

(21) Appl. No.: 09/195,238

(22) Filed: Nov. 18, 1998

(30) Foreign Application Priority Data

Nov. 20, 1997 (JP) ...................................... 9-319245

(51) Int. Cl.⁷ ...................................... G11B 17/22
(52) U.S. Cl. .............................. 369/32; 369/219; 369/221
(58) Field of Search .............................. 369/32, 215, 219, 369/220, 221, 224–226

(56) References Cited

FOREIGN PATENT DOCUMENTS

0463720 A2  4/1991  (EP) .
2151373  7/1985  (GB) .

Primary Examiner—Aristotelis M. Psitos
(74) Attorney, Agent, or Firm—Armstrong, Westerman, Hattori, McLeland & Naughton

(57) ABSTRACT

A disk recording or playback device has mounted on a chassis a pickup for detecting addresses on a disk, and a sensor switch SW for detecting the pickup as brought to the inner peripheral side of the disk. The pickup is moved toward a lead-in area of the disk to turn on the switch SW, thereafter reversely moved and caused to overrun for a predetermined period of time from a position where the switch SW is turned off. The pickup reads an address on the disk and is thereafter returned. When the address is outside a target region within the lead-in area, the pickup is repeatedly moved toward the lead-in area again with the overrun time altered. The overrun time is stored which enables the pickup to read an address within the target region upon overrunning.

8 Claims, 14 Drawing Sheets

φ29
(−134CLUSTER)

φ32
(0CLUSTER)

φ61
(1970CLUSTER)

φ64
(2060CLUSTER)

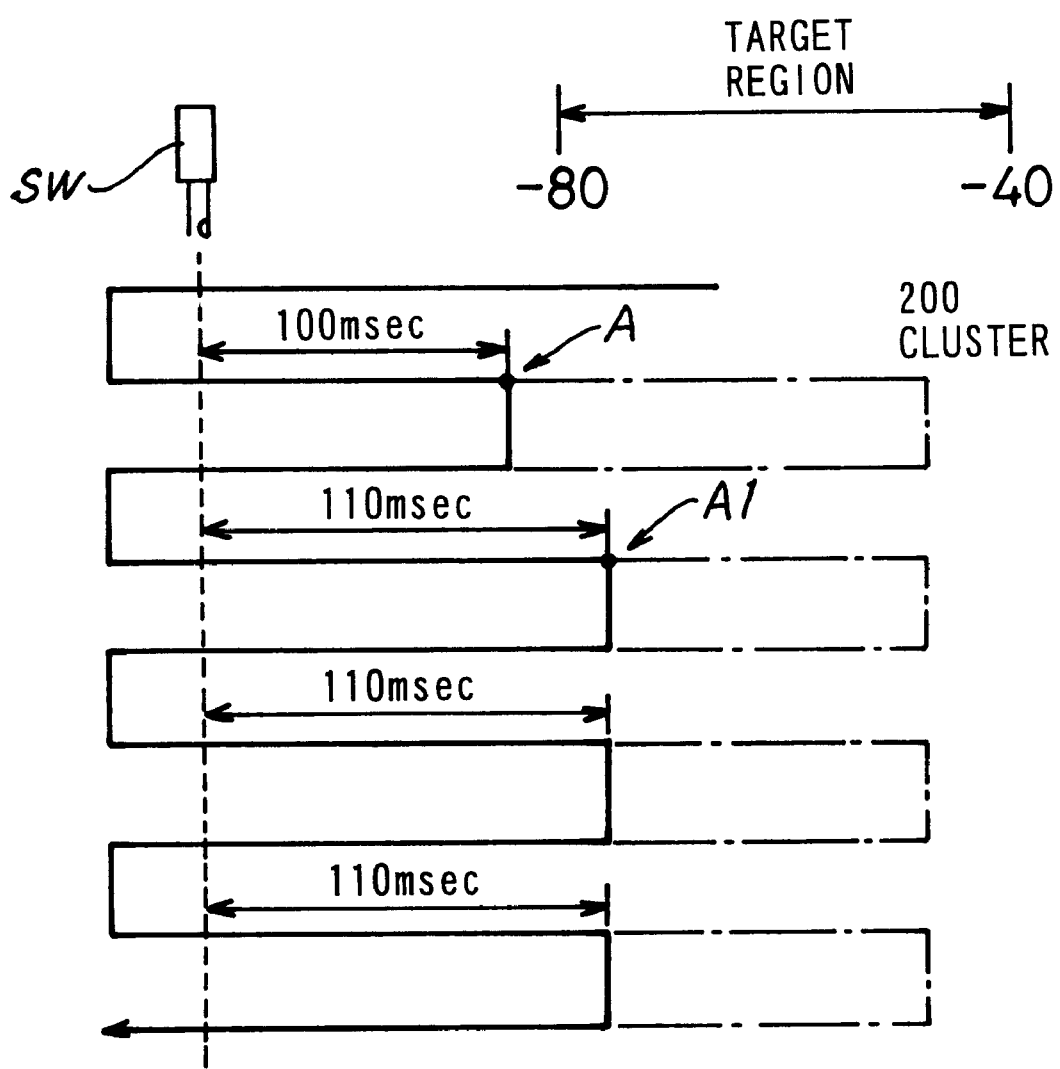

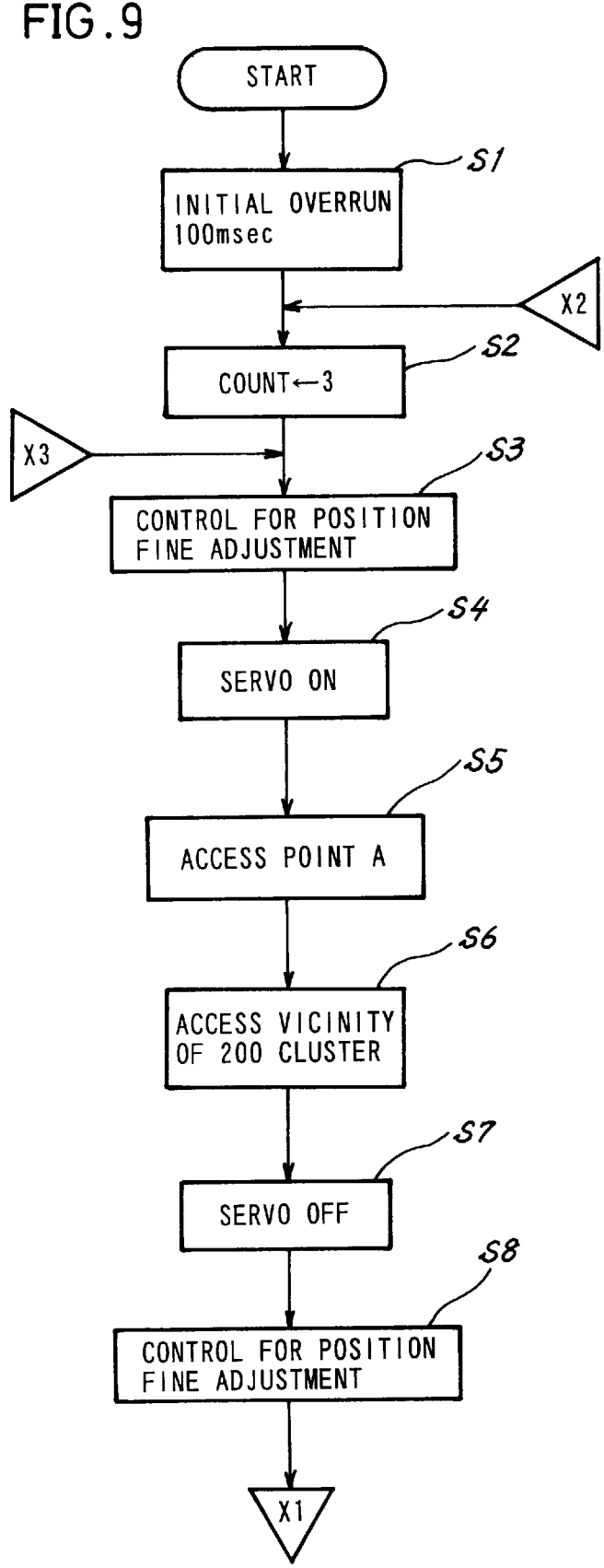

DISK RECORDING OR PLAYBACK DEVICE AND METHOD OF ADJUSTING INITIAL POSITION OF PICKUP THEREOF

FIELD OF THE INVENTION

The present invention relates to disk recording or playback devices by which information is recorded on or reproduced from disks serving as recording media, and a method of adjusting the initial position of the pickup of the device.

BACKGROUND OF THE INVENTION

FIG. 2 shows a mechanism deck 2 already known for use in such disk recording or playback devices. The deck 2 comprises a chassis 4 formed with an opening 40, two guide rods 41, 41 extending across the opening 40, and a turntable 31 provided at an end portion of the opening 40 for rotating a disk. Mounted on the two guide rods 41, 41 is a pickup 3 having an object lens 30 and movable toward the turntable 31. The pickup 3 is driven by a motor (not shown) on the chassis 4. Provided inside the opening 40 close to the turntable 31 is a sensor switch SW for detecting the pickup 3 as brought closest to the inner periphery of the disk.

The disk 6 is housed in a cartridge 60, which is provided with a movable shutter 61. With the cartridge 60 placed on support pins 42 on the chassis 4, the shutter 61 slidingly moves to expose the lower surface of the disk 6, whereupon a beam is projected from the lens 30 of the pickup 3 for recording or playback.

With reference to FIG. 3, the disk 6 is 64 mm in outside diameter and 29 mm in inside diameter. An inner peripheral region ranging from 29 mm to 32 mm in diameter is referred to as a lead-in area A, a region ranging from 32 mm to 61 mm in diameter as a program area B, and an outer peripheral region ranging from 61 mm to 64 mm in diameter as a lead-out area. Recorded in the lead-in area A is a so-called TOC (table of contents) which is a summary of the information recorded on the disk. For the recognition of the position of the pickup 3, the lead-in area A invariably needs to have recorded therein signals. The program area B has recorded therein desired information such as music signals. Detection of the lead-out area C by the pickup 3 indicates that the pickup 3 has moved out of the program area B.

The pickup 3 is designed to be positioned in the lead-in area A when in a standby state for recording or playback, pressing the sensor switch SW. This position will be referred to as an initial position. The pickup 3 reads the TOC data, recognizes the initial position and thereafter moves to a desired address for recording or playback. For accurate reading of signals from the disk, it is necessary to activate a focus servo for focusing the beam on the disk, a tracking servo for accurately tracking record grooves in the disk and a speed servo for rotating the disk at a constant speed based on the synchronization signal recorded on the disk.

If no signal is recorded at the location first exposed to the beam from the pickup 3, the synchronization signal is undetectable, so that it is impossible to activate the speed servo, consequently failing to effect a proper recording or playback operation subsequently.

Thus, the pickup 3 in the initial position needs to be positioned correctly in the lead-in area.

However, mass production of devices of the type described involves variations in the position or angle of the sensor switch SW mounted on the chassis 4, therefore entailing the likelihood that the pickup 3 will not be positioned correctly in the lead-in area when halted on pressing the sensor switch SW. It is also likely that the pickup 3, which is driven by a motor (not shown), will not be located in the lead-in area when in the initial position even if the sensor switch SW is correctly installed in place owing to variations in the drive force of the motor or to variations in the moving load of the pickup 3. This problem may be overcome by checking every mechanism deck 2 for the installed position of the sensor switch SW, whereas the procedure requires time and labor.

SUMMARY OF THE INVENTION

An object of the present invention is correctly position the pickup in the lead-in area by a simple method when the pickup is in the standby state for recording or playback.

The invention provides a disk recording or playback device which has mounted on a chassis 4 a pickup 3 movable along the signal recording surface of a disk for projecting a beam on the recording surface to detect addresses on the disk, and a sensor switch SW for detecting the pickup 3 as brought to the inner peripheral side of the disk.

The flow charts of FIGS. 9 and 10 show the outline of the present invention. First, a target region where the pickup 3 is to be positioned initially is provided in the lead-in area of the disk at the inner peripheral side of the disk.

The pickup 3 is moved from the outer peripheral side of the disk toward the lead-in area, reversely moved 5 upon the sensor switch SW detecting the passage of the pickup 3, and caused to overrun for a predetermined period of time (S1) toward the disk outer periphery from a position where the switch SW detects the passage of the pickup 3 again (S3).

The pickup 3 reads an address A on the disk after the overrun (S5) and is thereafter returned.

The pickup 3 is moved toward the disk outer peripheral side again at least once with the overrun time corrected to a shorter period (S10, S11) if the address A is beyond the target region toward the disk outer peripheral side, or with the overrun time corrected to a longer period (S12, S13) if the address A is closer to the disk inner peripheral side than the target region. The period of overrun time is stored which eventually enables the pickup to read an address within the target region (S16).

When recording or playback is to be started again, the pickup 3, as returned to a position closer to the disk inner peripheral side than the sensor switch SW, is moved outward so as to move from the position of detection of the pickup 3 by the switch SW for the stored period of overrun time.

In this way, the pickup 3 can be initially positioned correctly in the lead-in area when the period of overrun time is predetermined for every recording or playback device and the location where the pickup 3 is to be positioned initially is stored therein. The pickup 3 in the standby state for recording or playback can accurately read signals from the disk. This sets the pickup 3 in an ideal initial position to subsequently ensure a smooth recording or playback operation.

BRIEF DESCRIPTION OF THE DRAWINGS

FIG. 8 is a diagram showing another relationship in position between the sensor switch and the target area according to the first embodiment;

FIG. 9 is a flow chart showing a method of controlling the initial position of a pickup according to the first embodiment;

DESCRIPTION OF THE PREFERRED EMBODIMENTS

Figure 1:
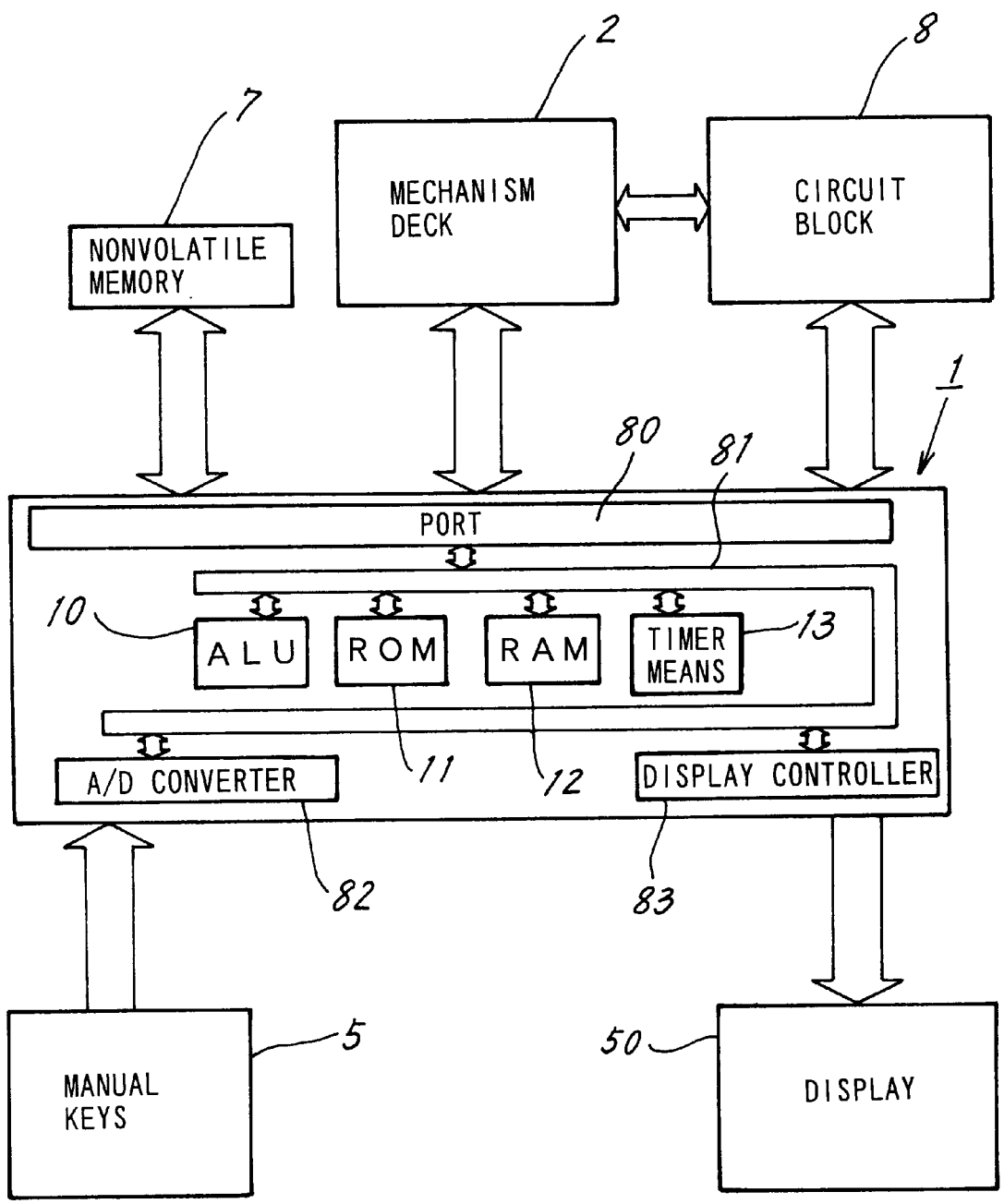
FIG. 1 is a block diagram showing the interior of a disk recording or playback device.

Embodiments of the invention will be described below in detail with reference to the drawings. The same components of the device of the invention as those of the conventional one will be each designated by like reference numeral. The disk is the same as the conventional one.

[Overall Construction]

Figure 2:
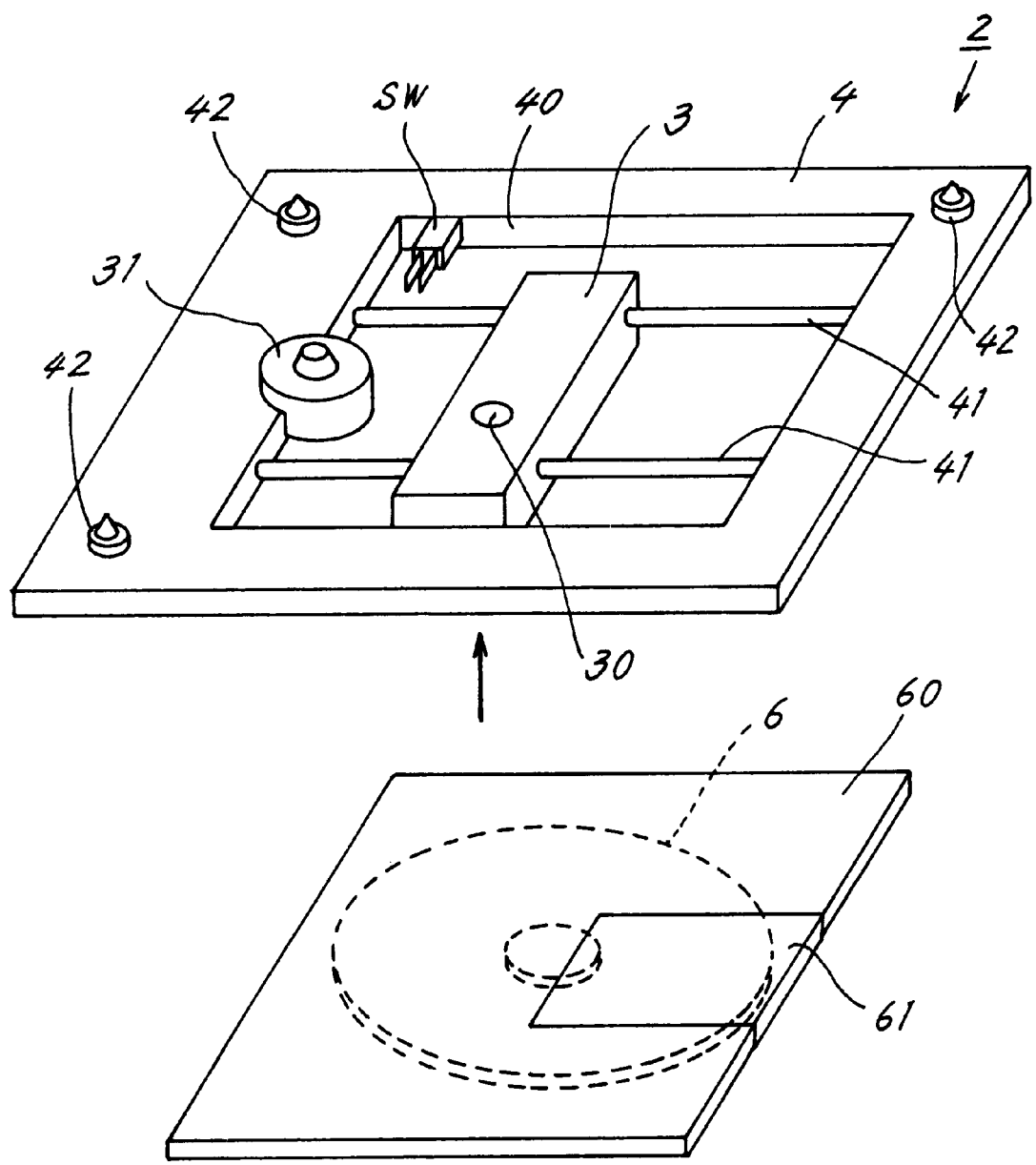
FIG. 2 is a perspective view of a mechanism deck.
Figure 16:
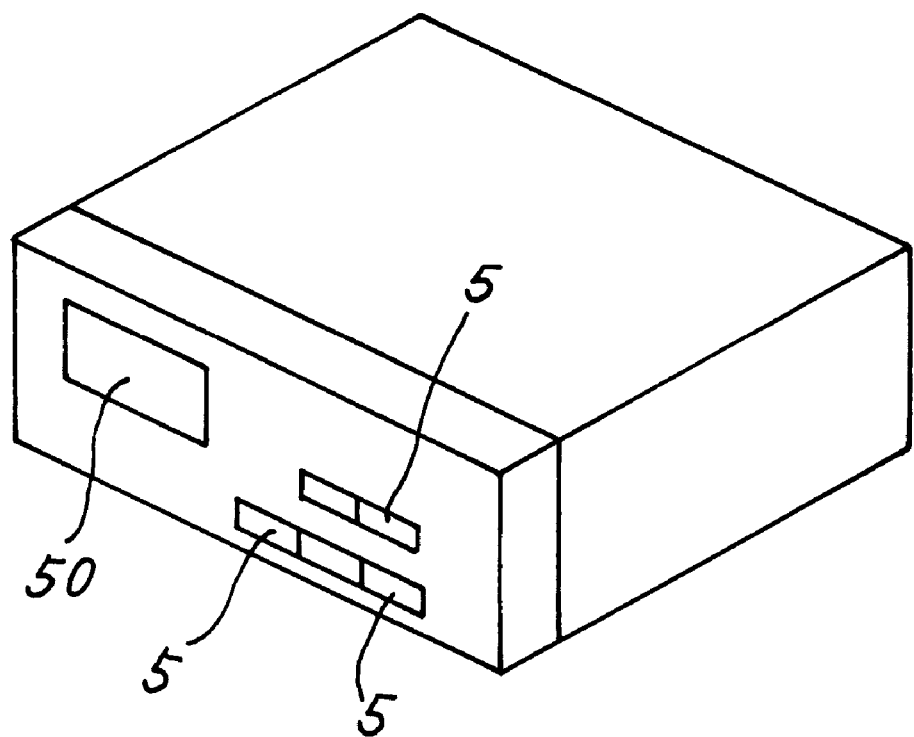
FIG. 16 is an overall perspective view of the disk recording or playback device.

FIG. 1 is a block diagram showing a disk recording or playback device in its entirety. The device comprises as connected to a microcomputer (hereinafter referred to merely as the "computer") 1 a nonvolatile memory 7, mechanism deck 2, circuit block 8, manual keys 5 (see FIG. 16) to be manipulated by the user, and display 50 (see FIG. 16) for showing the operating state of the device. The mechanism deck 2 has the same construction as the one shown in FIG. 2.

The computer 1 has incorporated therein an arithmetic and logic unit (hereinafter referred to as "ALU") 10, ROM 11 having stored therein an operating program, RAM 12 for storing the period of overrun time and count to be described later and timer means 13 for measuring predetermined elapsed time, which are connected by a bus line 81. The nonvolatile memory 7, mechanism deck 2 and circuit block 8 are connected via ports 80 to the bus line 81. The display 50 is connected to the bus line 81 via a display controller 83, and the manual keys 5 are connected to the line 81 via an A/D converter 82. The circuit block 8 comprises a signal compression-expansion circuit of the ATRAC (Adaptive Transform Acoustic Coding) type standardized for use in such disk recording or display devices, and the circuits of focus servo, tracking servo and speed servo described, and is electrically connected to the mechanism deck 2. Stored in the nonvolatile memory 7 is the overrun time of the motor for driving the pickup 3.

The term the "focus servo" refers to a servo for delicately moving the lens 30 of the pickup 3 upward or downward for focusing a beam from the lens 30 on the rear surface of a disk. The known astigmatism method is mainly used for the servo. The term the "tracking servo" refers to controlling the position of the beam so that the focus of the beam correctly tracks the pits in the disk. The known beam method or push-pull method is used. The term the "speed servo" refers to controlling the rotation of the disk so as to give the disk a constant linear speed, i.e., 1.4 m/sec. The servo is activated based on the difference between a reference signal on the disk and a reference signal on the circuit.

In the following description, activating the focus servo, tracking servo and speed servo in sequence will be referred to as "turning on the servo," and inactivating the servos as "turning off the servo."

Figure 3:
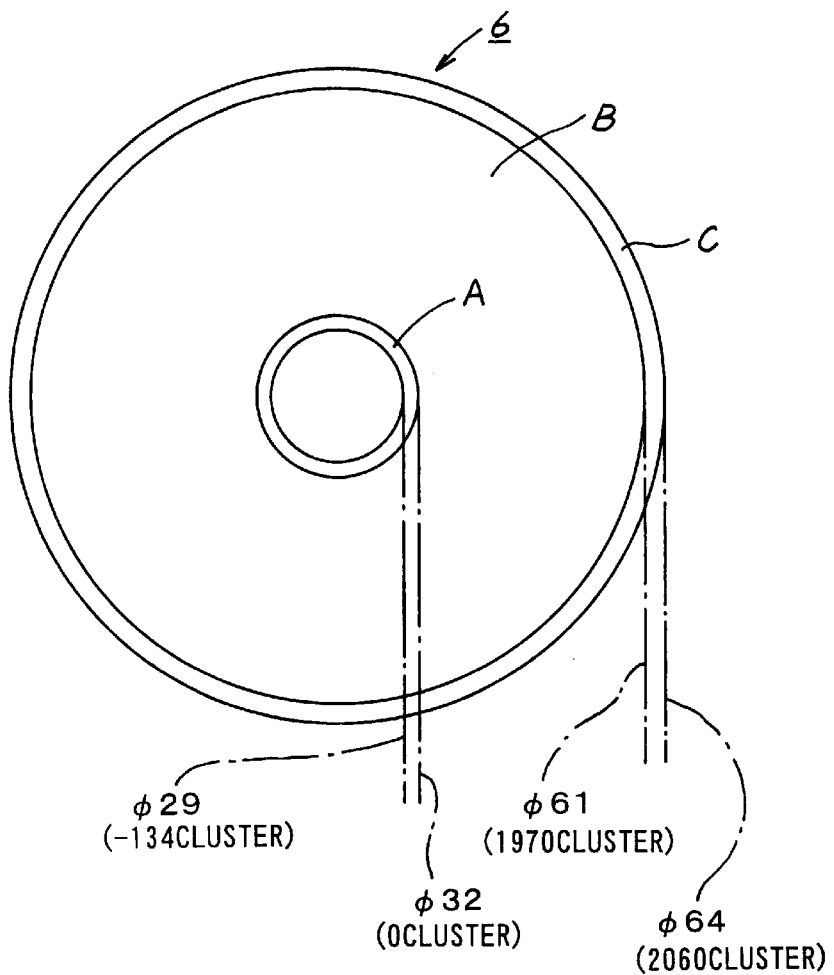
FIG. 3 is plan view of a disk.
Figure 4:
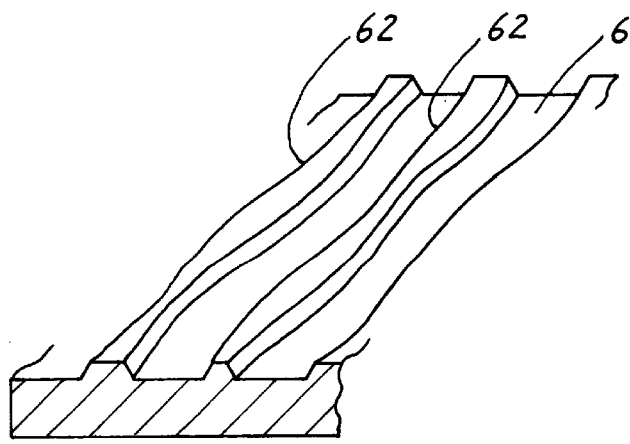
FIG. 4 is a perspective view of pregroove in the disk.

As shown in FIG. 4, the disk of the type described has grooves called pregrooves 62 and formed over the entire area of its rear surface circumferentially thereof except the lead-in area (A, in FIG. 3), the grooves extending slightly in zigzag. An address is provided at every distance of movement along the zigzag groove for 13.3 msec, and is detectable even when no data is recorded on the disk. In place of pregrooves 62, pits (not shown) are formed in the lead-in area.

The addresses corresponding to the distance of movement for 13.3 msec are termed one sector, and 36 sectors correspond to the distance of one cluster. The disk has the location of 0 cluster on a phantom circle with a diameter of 32 mm. The smallest cluster is −134 cluster on a phantom circle with a diameter of 29 mm, and the largest cluster is 2060 cluster on a phantom circle with a diameter of 64 mm.

Figure 5:
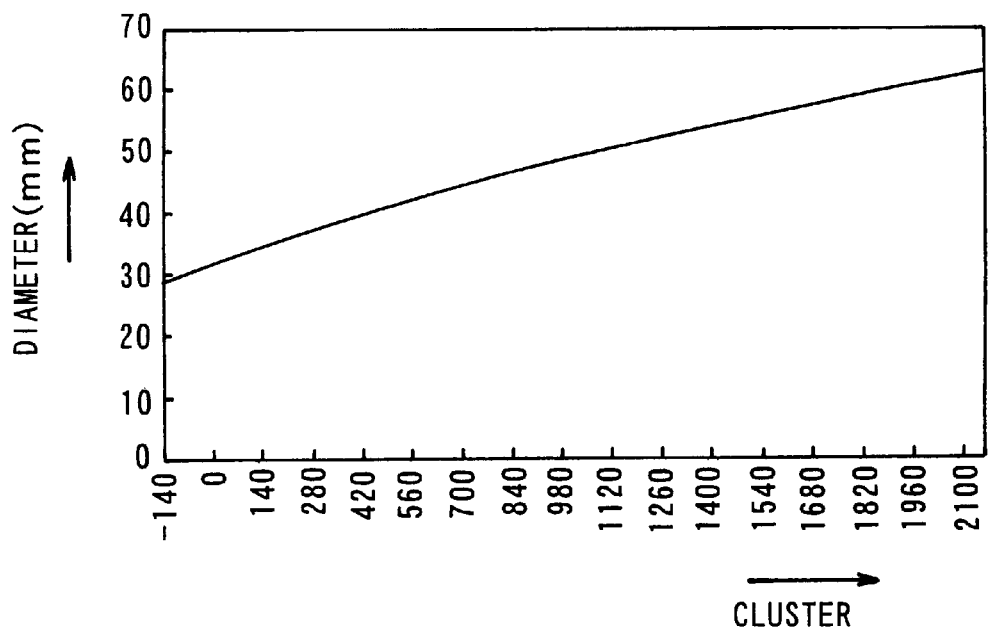
FIG. 5 is a graph showing the relationship between the address and the distance form the center of the disk to the address.

For recording or playback, a beam spot is first projected on the rear surface of the disk from the lens 30 of the pickup 3, the lens is moved upward or downward, and the focus servo is activated to focus the beam on the disk rear surface. The lens 30 is thereafter moved radially of the disk, and the tracking servo is activated for the beam to track the recording groove correctly, with the speed servo activated. After address data is read, the lens 30 or the pickup 3 is moved to move the beam to a desired address to read a desired signal. In the case where the disk is given a constant linear speed, the relationship between the address read first and the initial position is as shown in the graph of FIG. 5, in which plotted as ordinate is the distance from the center of the disk to the address vs. the address as expressed in terms of a cluster corresponding to the distance of movement of the pickup 3 as abscissa.

The pickup 3 in the initial position needs to be positioned within the lead-in area to read the TOC data first before starting recording or playback. As previously described, however, there is the likelihood that the pickup 3 will not be positioned correctly in the lead-in area owing to a variation in the position or angle of the sensor switch SW installed. It is also likely that the pickup 3 will not be position in the lead-in area because of variations in the drive force of the motor for driving the pickup 3 or variations in the moving load of the pickup 3.

To solve this problem, the initial position of the pickup 3 is adjusted according to the invention as shown in the flow charts to be described later.

A target region of −80 to −40 clusters within the lead-in area is provided for the initial position. The program for executing the initial position adjustment is stored in the ROM 11 of the computer 1. The program is read by the ALU 10.

The method of adjusting the initial position differs depending on whether the pickup 3 is caused to overrun toward the disk inner periphery or the disk outer periphery after moving past the sensor switch SW. The adjustment made by causing the pickup 3 to overrun initially toward the disk outer periphery will be referred to as a first embodiment, and the adjustment made by causing the pickup 3 to overrun initially toward the disk inner periphery will be referred to as a second embodiment.

First Embodiment

Figure 10:
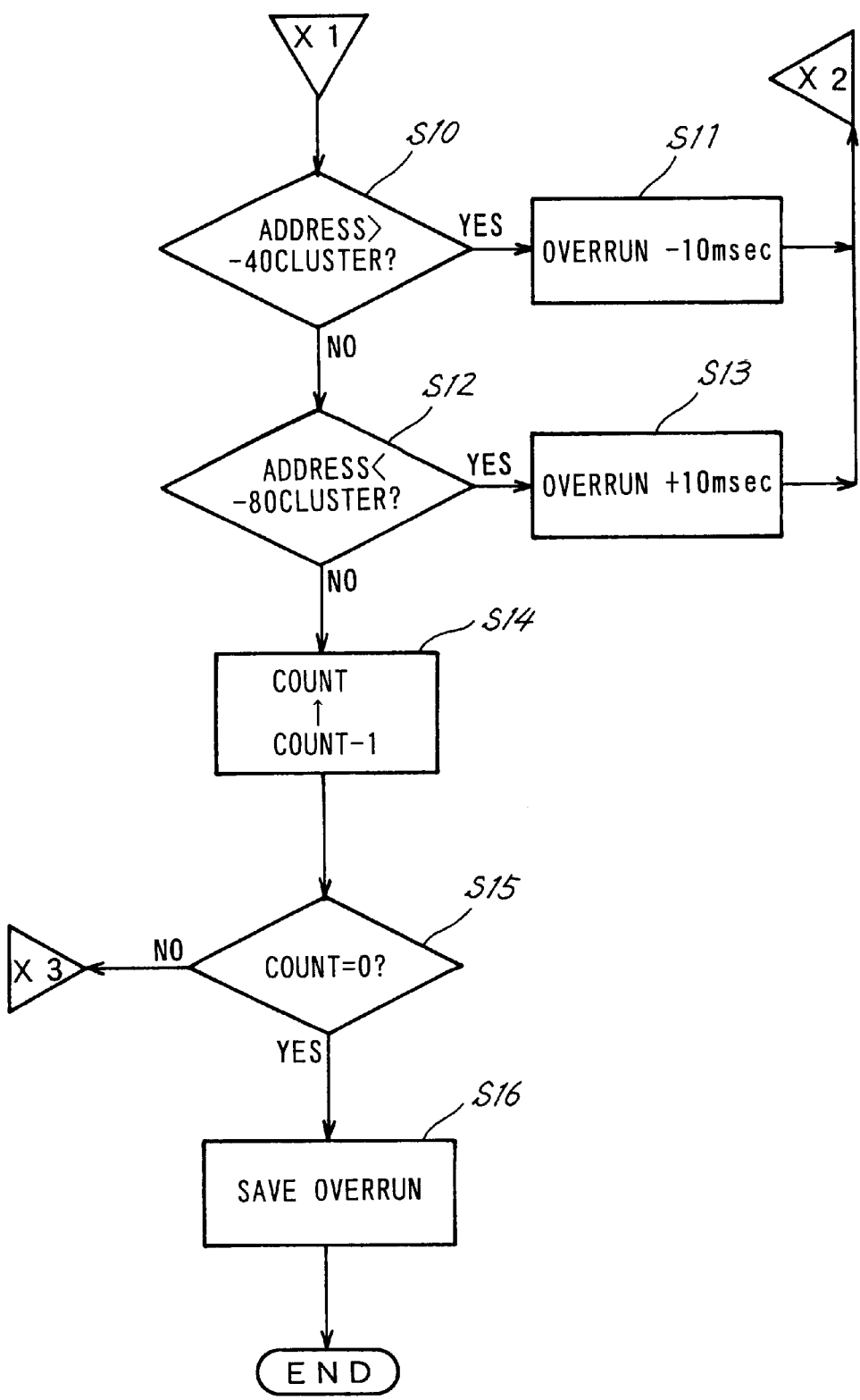
FIG. 10 is a flow chart showing the method of controlling the initial position of the pickup according to the first embodiment.

FIGS. 6A, 7A, 7B and 8 are diagrams showing relationships between the sensor switch SW, the lead-in area and the target region. FIGS. 9 and 10 are flow charts showing an initial position adjusting procedure according to the first embodiment. The sequence of position adjusting steps involves control for the fine adjustment of the position.

Figure 11:
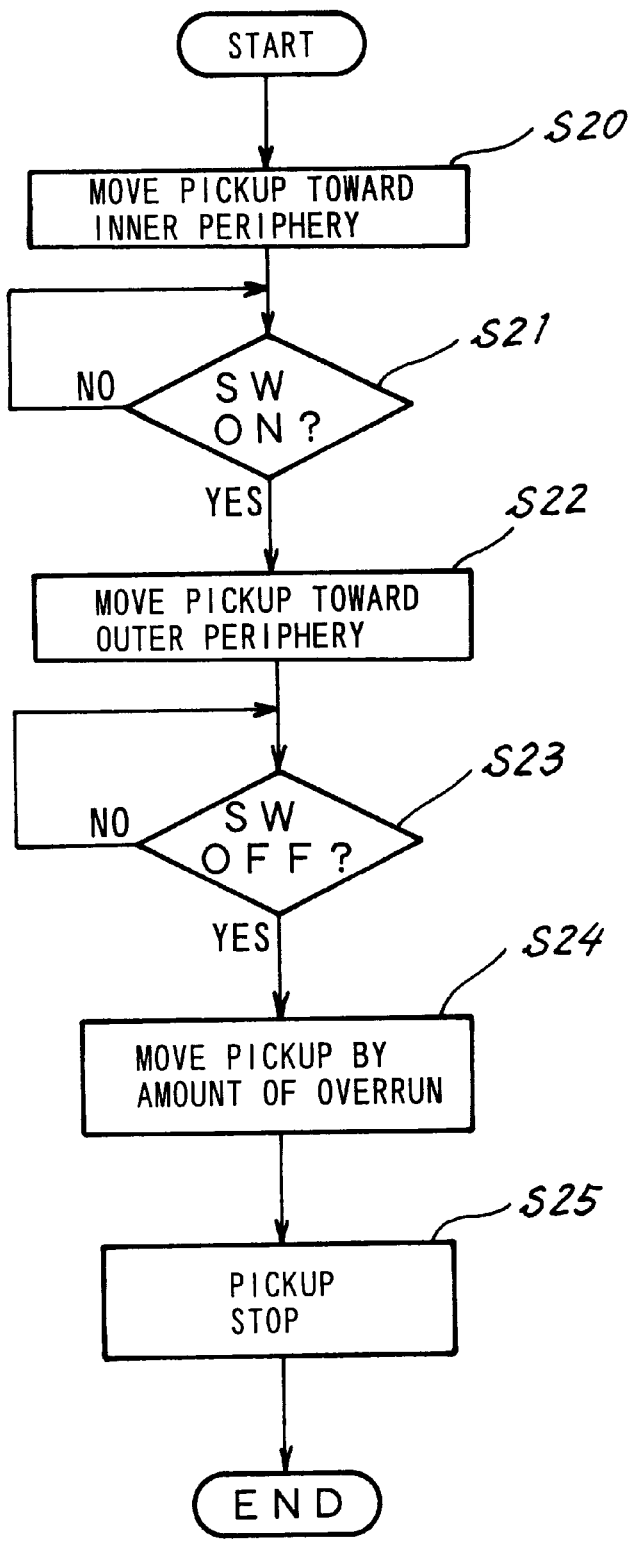
FIG. 11 is a flow chart of the position fine adjustment control of the first embodiment.

The control for position fine adjustment is an operation for reciprocatingly moving the pickup 3 by very small amounts on detecting the sensor switch SW as turned on and off. The mode of control is shown specifically in FIG. 6A and in the flow charts of FIG. 11. First, the pickup 3 is moved inward from the outer peripheral side of the disk (S20) to turn on the sensor switch SW (S21). This movement includes an overrun indicated at B1 due to the chattering treatment of the switch detection and the inertia of movement of the pickup 3. After completion of the overrun, the direction of movement of the pickup 3 is reversed (C1) to move the pickup toward the disk outer periphery (S22). The pickup 3 moves for a period of overrun time indicated at Dl after the sensor switch SW is turned off (S23, S24, S25). The period of overrun time D1 after the switch SW is turned off is intentionally determined by the computer 1.

The flow charts of FIGS. 9 and 10 will be described step by step. The RAM 12 of the computer 1 has stored therein 100 msec as the initial overrun time (S1).

First, the ALU 10 determines a count of 3 (S2). The count is the number of times the control for position fine adjustment is repeatedly effected subsequently. Since the pickup 3 is likely to read different addresses, the control is repeated three times to obtain reliable overrun time.

Next, the ALU 10 reads the initial overrun time D1 from the RAM 12 to effect the control for position fine adjustment (S3). Since the overrun time of 100 msec is determined in step S1, the pickup 3 moves for 100 msec after the sensor switch SW is turned off. This time measurement is done by the timer means (see FIG. 1) in the computer 1.

After the completion of overrun, the computer 1 turns on the servo (S4) and recognizes an address A at the location reached by the pickup 3 (S5). After the servo is turned on, the pickup 3 is moved toward the disk outer periphery to the location of a specified address as indicated in a broken line in FIG. 7A or 7B, more specifically to the vicinity of 200 cluster on the disk (S6). The servo is thereafter turned off (S7).

The pickup 3 is caused to overrun to the vicinity of 200 cluster because when moved for a period of overrun time of about 100 msec, the pickup moves a very short distance, failing to move at a stabilized speed. If the pickup 3, which is driven by a motor, is moved by a small amount, the motor fails to give stabilized drive torque. The pickup 3 is therefore caused to overrun further so as to obtain a stabilized speed.

Next, the pickup 3 is reversely moved and returned to the disk inner periphery, and the control for position fine adjustment is executed (S8).

[When Address is in Target Region]

Figure 7A:
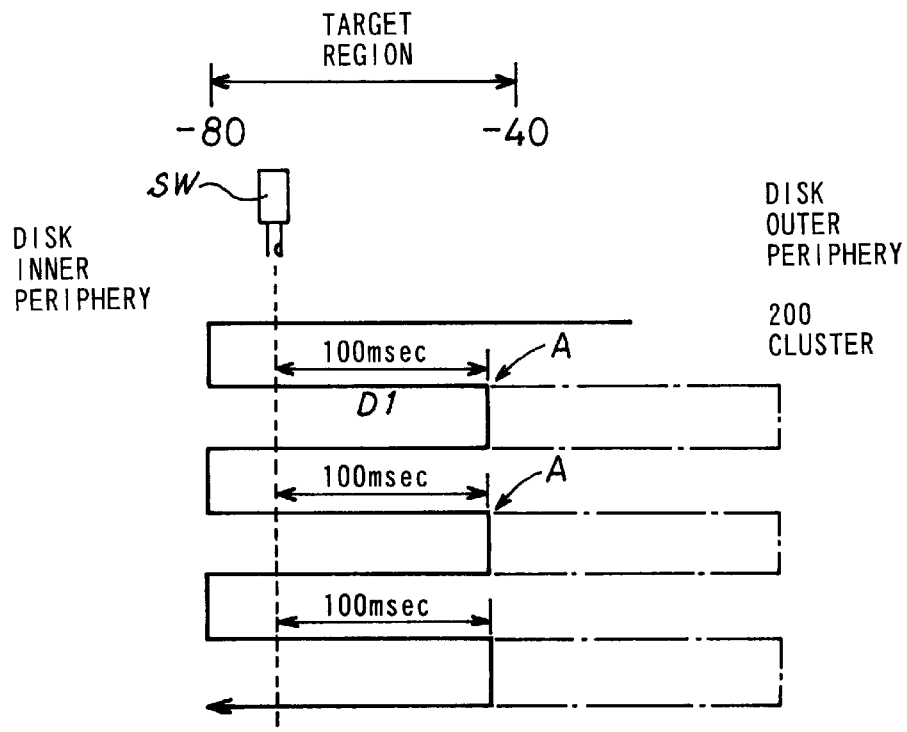
FIGS. 7A and 7B are diagrams showing relationships in position between a sensor switch and a target area according to the first embodiment.

When the address read in step S5 is within the target region as indicated at A in FIG. 7A, the sequence proceeds through steps S10, S11 to step S14, in which 1 is subtracted from the count, followed by step S3 again. This operation is repeated three times. When the count is 0 (S15), indicating that the repetition of the control for position fine adjustment has been completed, the overrun time is stored in the nonvolatile memory 7 (S16). This storage operation is performed by the ALU 10 according to the program stored in the ROM 11.

[When Address is beyond Target Region]

Figure 7B:
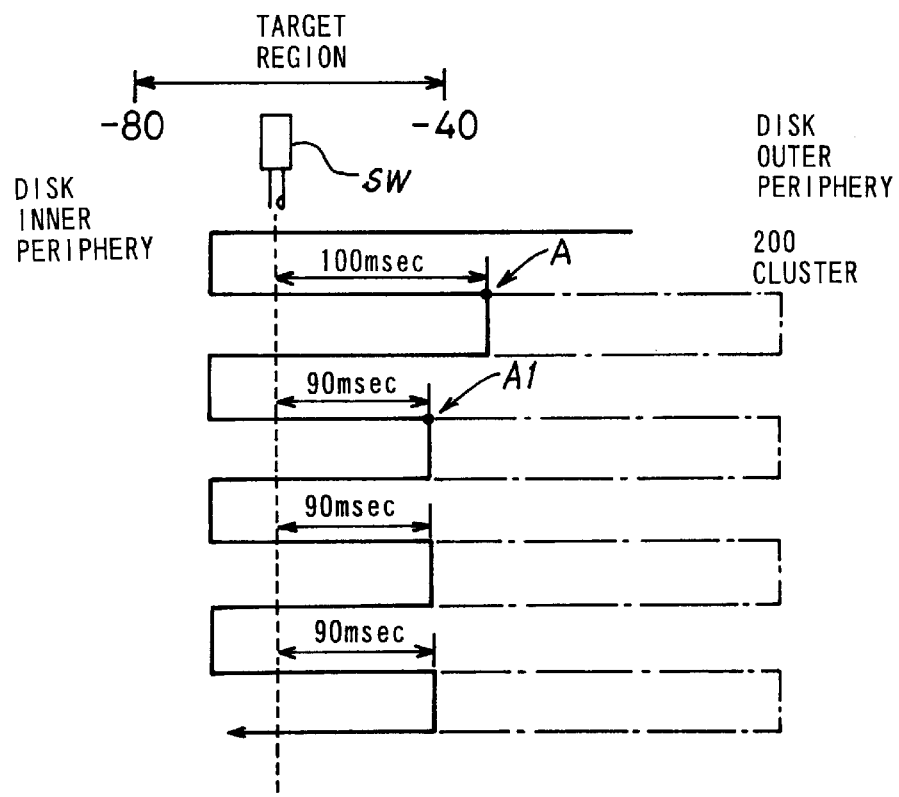

When the address read in step S5 is greater than −40 cluster and toward the outer periphery beyond the target region (S10) as indicated by point A in FIG. 7B, 10 msec is subtracted from the overrun time (S11), whereupon the sequence returns to step S2.

[When Address is Short of Target Region]

If the address read in step S5 is smaller than −80 cluster and toward the inner periphery outside the target region (S12) as indicated by point A in FIG. 8, 10 msec is added to the overrun time (S13), followed by step S2 again to repeat the foregoing steps.

When the pickup 3 is positioned within the target region, the control for position fine adjustment is repeated in the same manner as above, and the overrun time is stored in the nonvolatile memory 7 (S16).

Figure 15:
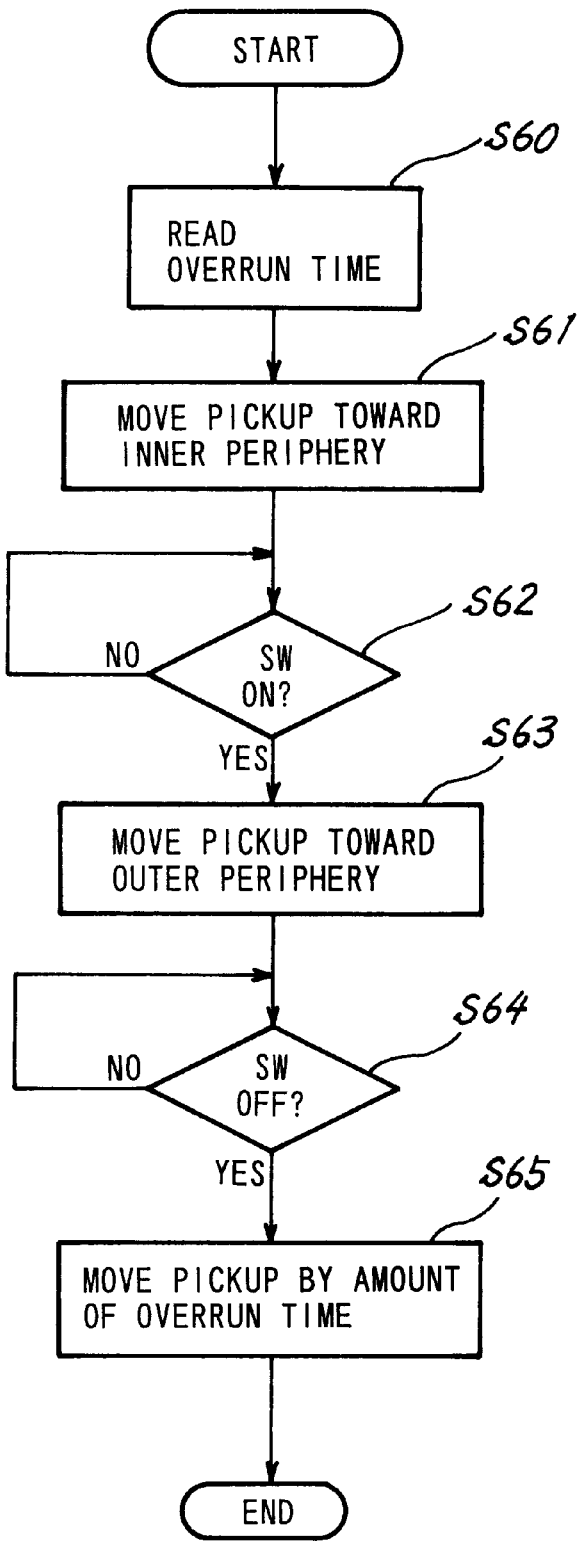
FIG. 15 is a flow chart showing a procedure for moving the pickup when stating recording or playback.

After the period of overrun time is determined, the device is deenergized. When recording or playback is to be started thereafter, the ALU 10 first reads the overrun time from the nonvolatile memory 7 (S60) as shown in the flow chart of FIG. 15. The pickup 3 is moved toward the disk inner periphery (S61), reversed after turning on the sensor switch SW (S62), and moved toward the disk outer periphery (S63). After the switch SW is turned off (S64), the pickup 3 is moved for the read overrun time (S65). The pickup 3 is positioned in the target region in the lead-in area, ready to accurately read the TOC signal. Thus, the pickup 3 is brought to an ideal initial position.

Second Embodiment

Figure 6A:
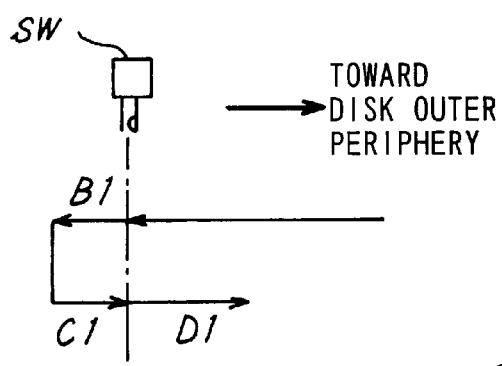
FIG. 6A is a diagram showing control for the fine adjustment of position according to a first embodiment.
Figure 6B:
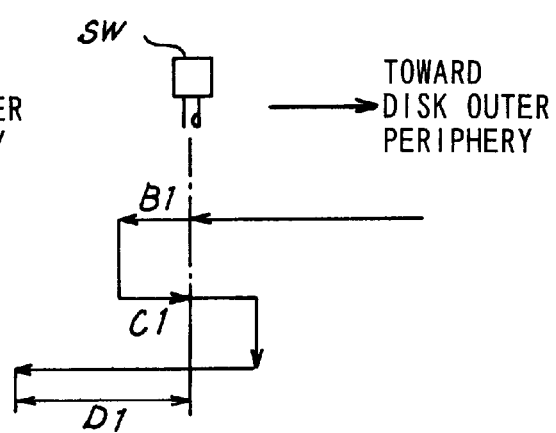
FIG. 6B is a diagram showing control for the fine adjustment of position according to a second embodiment.
Figure 12A:
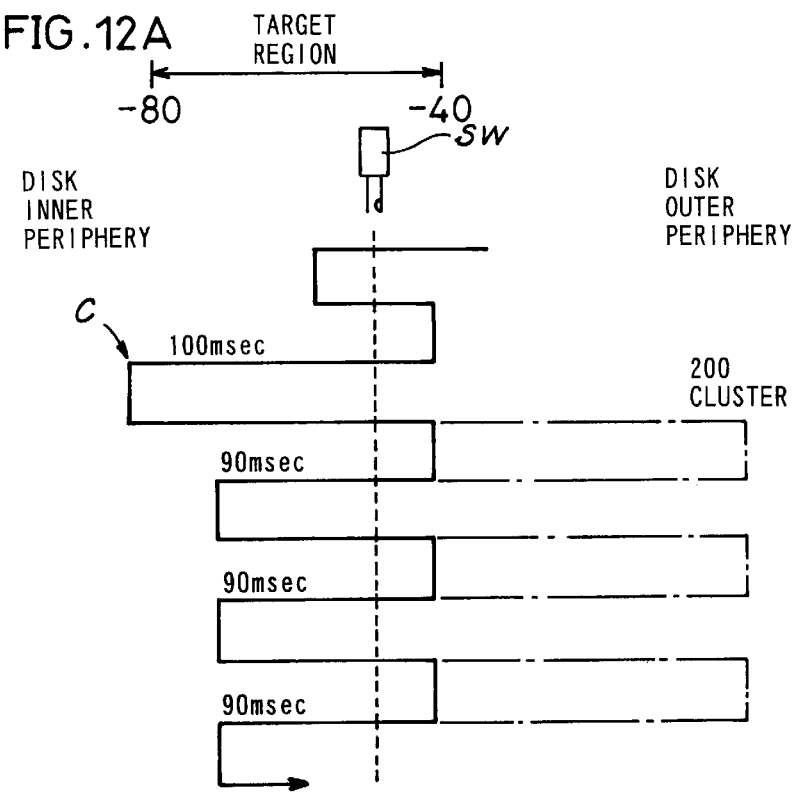
FIGS. 12A and 12B are diagrams showing relationships in position between the sensor switch and the target area according to the second embodiment.
Figure 12B:
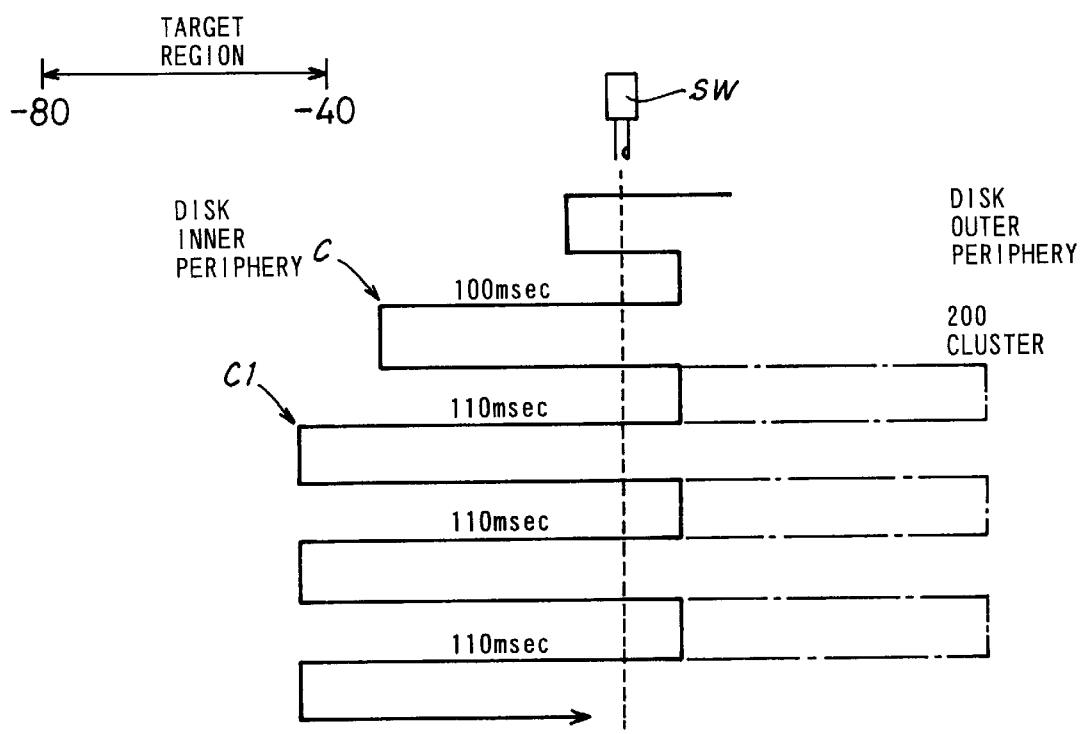

FIGS. 6B, 12A and 12B are diagrams showing relationships between the sensor switch SW, the lead-in area and the target region.

Figure 13:
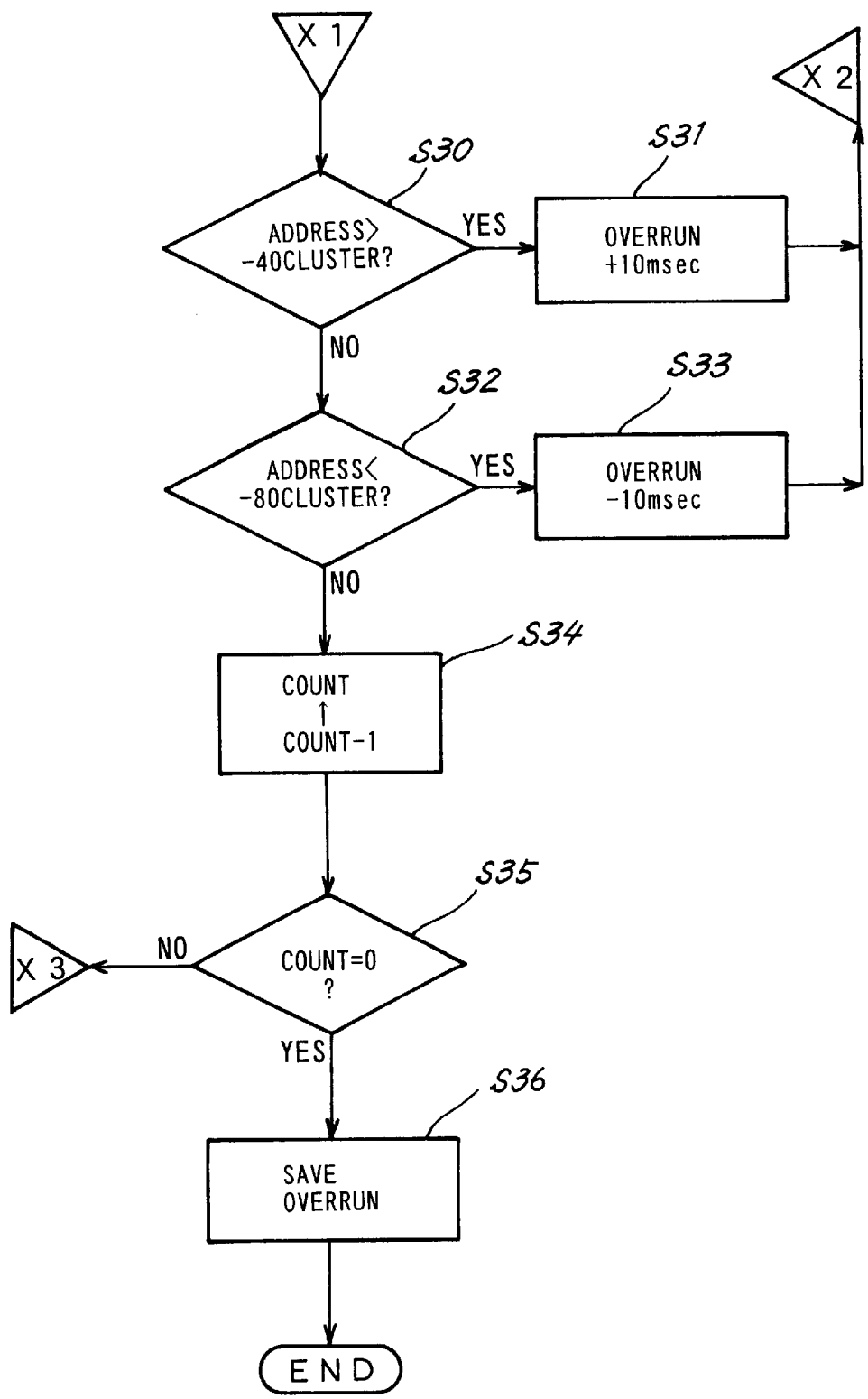
FIG. 13 is a flow chart showing a method of controlling the initial position of the pickup according to the second embodiment.
Figure 14:
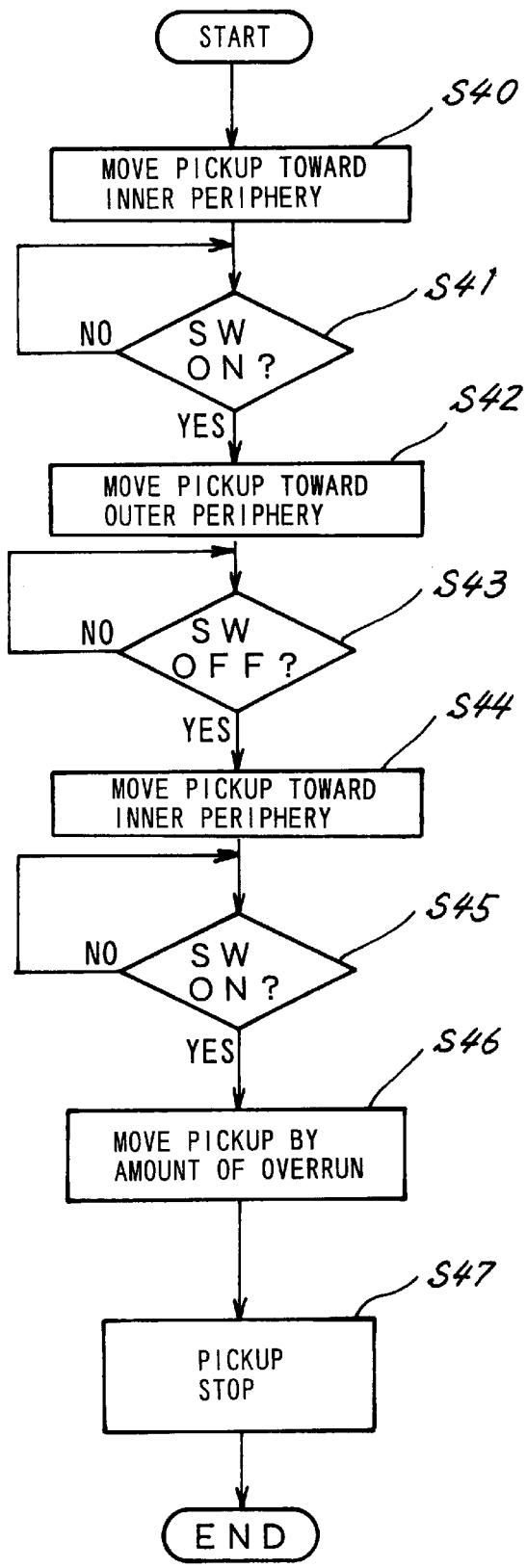
FIG. 14 is a flow chart of position fine adjustment control of the second embodiment.

FIGS. 9 and 13 are flow charts showing an initial position adjusting procedure according to this embodiment. The mode of control for position fine adjustment differs from that of the first embodiment, and is shown in FIG. 6B and the flow chart of FIG. 14. First, the pickup 3 is moved inward from the outer peripheral side of the disk (S40) to turn on the sensor switch SW (S41). After the completion of overrun indicated at B1 in FIG. 6B, the direction of movement of the pickup 3 is reversed (C1) to move the pickup toward the disk outer periphery (S42). The sensor switch SW is turned off (S43).

The above steps of control for position fine adjustment are the same as in the first embodiment, whereas according to the second embodiment, the movement of the pickup 3 is thereafter reversed again to move the pickup 3 toward the disk inner periphery (S44). After turning on the switch SW (S45), the pickup 3 is moved inward for a period of overrun time D1 (S46).

The procedure of this embodiment for initial position adjustment is shown in the flow chart of FIG. 9 and is the same as that of the first embodiment in that the period of initial overrun time and count are determined to effect the control for position fine adjustment, followed by turning on and off the servo.

However, the procedure is different from that of the first embodiment in that the period of overrun time is increased and decreased respectively in steps S31 and S33 of FIG. 13. After the position control, 10 msec is added to the overrun time (S31) when the address read is greater than −40 cluster as indicated by point C in FIG. 12B. The sequence thereafter returns to step S2.

When the address is smaller than −80 cluster as indicated by point C in FIG. 12A, the overrun time is decreased by 10 msec (S33), followed by step S2 again. When the count has reduced to 0 through repetition of position fine adjustment control, the resulting overrun time is stored in the nonvolatile memory 7 as in the first embodiment.

In the standby state for recording or playback, the pickup 3 is returned to the disk inner peripheral side. The pickup 3 is thereafter moved based on the overrun time stored in the nonvolatile memory 7 as in the first embodiment. However, the pickup 3 is moved toward the disk inner periphery.

The period of overrun time for initial position adjustment is stored in the nonvolatile memory 7, so that even after the power supply to the device has been switched off, the overrun time is held stored in the memory. Accordingly, when the overrun time is preset in the device in its manufacturing process, the pickup 3 in the standby state for recording or playback can be correctly positioned in the lead-in area even after the device is delivered to the user.

Whether the sensor switch SW is positioned toward the inner periphery of the disk or toward the outer periphery thereof relative to the target region is generally determined for a particular lot of mechanism decks 2, such that there is no need to determine for each mechanism deck 2 which of the first and second embodiments is to be used for initial position adjustment. The present applicant has found that with actual devices, the sensor switch SW is positioned generally toward the disk outer periphery beyond the target region.

According to the embodiments described, the period of initial overrun time used is 100 msec, and the count is three, whereas these values are of course variable suitably. The nonvolatile memory 7 generally comprises $E^2PROM$ or the like and is usually used also for storing characteristics values such as adjustment values, for example, of servo gains, coefficient of digital filters, etc. A vacant address is utilized for storing the overrun time of the pickup 3.

The initial adjustment of the pickup 3 is made in an adjusting step of the manufacturing process of the device after the device has been assembled. Stated more specifically, the adjustment is made according to a program stored in the ROM 11 of the computer while simultaneously pressing desired keys included in the manual keys 5, 5, 5 shown in FIG. 16. It is almost unlikely for the user to press the manual keys 5, 5, 5 at the same time and determine an optional period of overrun time.

According to the adjusting methods of the embodiments described above, the period of overrun time is altered with reference to addresses on the disk, whereas the overrun time may alternatively be determined by calculation from an address which is read initially. Further alternatively, the overrun time may be stored in a memory (not shown) provided in the computer 1 and adapted to retain the stored data by power supply backup. After the device has been completed and delivered to the user, the serviceman may manipulate the keys 5, 5, 5 to compensate for variations, for example, in the drive load of the pickup 3 which occur with the lapse of time.

What is claimed is:

1. A method of adjusting the initial position of a pickup of a disk recording or playback device having mounted on a chassis a pickup movable along a signal recording surface of a disk for projecting a beam on the recording surface to detect addresses on the disk, and a sensor switch SW for detecting the pickup as moved to an inner peripheral side of the disk, the initial position adjusting method comprising:

providing a target region within a lead-in area at the inner peripheral side of the disk, moving the pickup from an outer peripheral side of the disk toward the lead-in area, reversely moving the pickup upon the sensor switch SW detecting the passage of the pickup, and causing the pickup to overrun for a predetermined period of time toward the disk outer peripheral side from a position where the sensor switch SW detects the passage of the pickup again, returning the pickup upon reading an address A on the disk after the overrun, moving the pickup toward the disk outer peripheral side again at least once with the overrun time corrected to a shorter period if the address A is beyond the target region toward the disk outer peripheral side, or with the overrun time corrected to a longer period if the address A is closer to the disk inner peripheral side than the target region, and storing the period of overrun time eventually enabling the pickup to read an address within the target region upon overrunning, and outwardly moving the pickup as returned to a position closer to the disk inner peripheral side than the sensor switch SW to move the pickup from the position of detection of the pickup by the sensor switch SW for the stored period of overrun time when recording or playback is to be started again.

2. A method of adjusting the initial position of a pickup according to claim 1 wherein after overrunning toward the disk outer peripheral side upon the sensor switch SW detecting the passage of the pickup and reading the address A, the pickup is moved toward the disk outer peripheral side to the position of a predetermined address to stabilize the movement of the pickup, and is thereafter returned.

3. A disk recording or playback device having mounted on a chassis a pickup movable along a signal recording surface of a disk for projecting a beam on the recording surface to detect addresses on the disk, and a sensor switch SW for detecting the pickup as moved to an inner peripheral side of the disk, the disk recording or playback device being characterized in that the device comprises:

an arithmetic and logic unit for reading a target region within a lead-in area at the inner peripheral side of the disk in which region the pickup is to be positioned initially, a ROM having stored therein a program comprising moving the pickup from an outer peripheral side of the disk toward the lead-in area, reversely moving the pickup upon the sensor switch SW detecting the passage of the pickup, and causing the pickup to overrun for a predetermined period of time toward the disk outer peripheral side from a position where the sensor switch SW detects the passage of the pickup again; returning the pickup upon reading an address A on the disk after the overrun; and moving the pickup toward the disk outer peripheral side again at least once with the overrun time corrected to a shorter period if the address A is beyond the target region toward the disk outer peripheral side, or with the overrun time corrected to a longer period if the address A is closer to the disk inner peripheral side than the target region, and a memory for storing the period of overrun time eventually enabling the pickup to read an address within the target region upon overrunning, the device further being characterized in that when recording or playback is to be started again, the pickup as returned to a position closer to the disk inner peripheral side than the sensor switch SW is moved outward and thereby moved from the position of detection of the pickup by the sensor switch SW for the stored overrun time.

4. A disk recording or playback device according to claim 3 wherein the memory is nonvolatile and retains stored data even after the power supply to the device is switched off.

5. A method of adjusting the initial position of a pickup of a disk recording or playback device having mounted on a chassis a pickup movable along a signal recording surface of a disk for projecting a beam on the recording surface to detect addresses on the disk, and a sensor switch SW for detecting the pickup as moved to an inner peripheral side of the disk, the initial position adjusting method comprising:

providing a target region within a lead-in area at the inner peripheral side of the disk to position the pickup initially in the target region, moving the pickup from an outer peripheral side of the disk toward the lead-in area, reversing the movement of the pickup repeatedly after the sensor switch SW detects the passage of the pickup, and causing the pickup to overrun for a predetermined period of time further toward the disk inner peripheral side after the sensor switch SW detects the movement of the pickup toward the disk inner peripheral side again, returning the pickup toward the disk outer peripheral side upon reading an address C on the disk after the overrun, and halting the pickup upon the sensor switch SW detecting the passage of the pickup, moving the pickup toward the disk inner peripheral side again at least once with the overrun time corrected to a shorter period if the address C is closer to the disk inner peripheral side than the target region, or with the overrun time corrected to a longer period if the address C is beyond the target region toward the disk outer peripheral side, and storing the period of overrun time eventually enabling the pickup to read an address within the target region upon overrunning, and outwardly moving the pickup as returned to a position closer to the disk inner peripheral side than the sensor switch SW to move the pickup from the position of detection of the pickup by the sensor switch SW for the stored period of overrun time when recording or playback is to be started again.

6. A method of adjusting the initial position of a pickup according to claim 5 wherein in returning the pickup toward the disk outer peripheral side upon reading the address C, the pickup is moved toward the disk outer peripheral side to the position of a predetermined address after the sensor switch SW detects the passage of the pickup to stabilize the movement of the pickup, and the pickup is thereafter returned toward the disk inner peripheral side.

7. A disk recording or playback device having mounted on a chassis a pickup movable along a signal recording surface of a disk for projecting a beam on the recording surface to detect addresses on the disk, and a sensor switch SW for detecting the pickup as moved to an inner peripheral side of the disk, the disk recording or playback device being characterized in that the device comprises:

an arithmetic and logic unit for reading a target region within a lead-in area at the inner peripheral side of the disk in which region the pickup is to be positioned initially, a ROM having stored therein a program comprising moving the pickup from an outer peripheral side of the disk toward the lead-in area, reversing the movement of the pickup repeatedly after the sensor switch SW detects the passage of the pickup, and causing the pickup to overrun for a predetermined period of time further toward the disk inner peripheral side after the sensor switch SW detects the movement of the pickup toward the disk inner peripheral side again; returning the pickup toward the disk outer peripheral side upon reading an address C on the disk after the overrun, and halting the pickup upon the sensor switch SW detecting the passage of the pickup; and moving the pickup toward the disk inner peripheral side again at least once with the overrun time corrected to a shorter period if the address C is closer to the disk inner peripheral side than the target region, or with the overrun time corrected to a longer period if the e address C is beyond the target region toward the disk outer peripheral side, and storing the period of overrun time eventually enabling the pickup to read an address within the target region upon overrunning, and a memory for storing the period of overrun time enabling the pickup to read an address within the target region upon overrunning, the device further being characterized in that when recording or playback is to be started again, the pickup as returned to a position closer to the disk inner peripheral side than the sensor switch SW is moved outward and thereby moved from the position of detection of the pickup by the sensor switch SW for the stored overrun time.

8. A method of adjusting the initial position of a pickup of a disk recording or playback device having mounted on a chassis a pickup movable along a signal recording surface of a disk for projecting a beam on the recording surface to detect addresses on the disk, and a sensor switch SW for detecting the pickup as moved to an inner peripheral side of the disk, the initial position adjusting method comprising:

providing a target region within a lead-in area at the inner peripheral side of the disk to position the pickup initially in the target region, moving the pickup from an outer peripheral side of the disk toward the lead-in area, reversely moving the pickup upon the sensor switch SW detecting the passage of the pickup, and causing the pickup to overrun for a predetermined period of time toward the disk outer or inner peripheral side from a position where the sensor switch SW detects the passage of the pickup again, causing the pickup to read an address on the disk after the overrun, varying the period of overrun time when the address is outside the target region, and moving the pickup again at least once toward the lead-in area, storing the period of overrun time eventually enabling the pickup to read an address within the target region upon overrunning, and outwardly moving the pickup as returned to a position closer to the disk inner peripheral side than the sensor switch SW to move the pickup from the position of detection of the pickup by the sensor switch SW for the stored overrun time when recording or playback is to be started again.

* * * * *